(12) United States Patent
Koo

(10) Patent No.: US 7,324,090 B2
(45) Date of Patent: Jan. 29, 2008

(54) MODULAR SCROLL WHEEL WITH INTEGRAL DETENT-ENGAGING SPRINT TAB

(75) Inventor: James Y. Koo, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 366 days.

(21) Appl. No.: 10/985,956

(22) Filed: Nov. 12, 2004

(65) Prior Publication Data

US 2005/0110759 A1    May 26, 2005

Related U.S. Application Data

(63) Continuation of application No. 10/158,996, filed on Jun. 3, 2002, now Pat. No. 6,987,505.

(51) Int. Cl.
*G09G 5/00* (2006.01)

(52) U.S. Cl. ............ 345/163; 345/156; 345/157; 345/158; 345/164; 345/165; 345/166; 345/167

(58) Field of Classification Search ............ 345/163, 345/156–158, 164–167
See application file for complete search history.

(56) References Cited

U.S. PATENT DOCUMENTS

| | | |
|---|---|---|
| 4,712,101 A | 12/1987 | Culver |
| 4,720,703 A | 1/1988 | Schnarel, Jr. et al. |
| 5,063,289 A | 11/1991 | Jasinski et al. |
| 5,235,868 A | 8/1993 | Culver |
| 5,404,152 A | 4/1995 | Nagai |
| 5,446,481 A | 8/1995 | Gillick et al. |
| 5,477,508 A | 12/1995 | Will |
| 5,521,617 A | 5/1996 | Imai et al. |
| 5,530,455 A | 6/1996 | Gillick |
| 5,771,038 A | 6/1998 | Wang |

(Continued)

FOREIGN PATENT DOCUMENTS

CN    1267016 A    9/2000

(Continued)

OTHER PUBLICATIONS

<http://www.mside.net/microscrollii.html> , MSIDE.net, showing Micro Scroll II mouse from Micro, 2 sheets, Dec. 2000.

(Continued)

*Primary Examiner*—Richard Hjerpe
*Assistant Examiner*—Leonid Shapiro
(74) *Attorney, Agent, or Firm*—Birch, Stewart, Kolasch & Birch, LLP

(57) ABSTRACT

A single-piece component rotatably supports a scroll wheel and includes an integral follower arm extending into a well within which the scroll wheel rotates. Formed on a circumferential surface of the scroll wheel are regularly spaced detents or other structures forming regularly spaced regions of alternating height. Located on an end of the follower arm is a follower which moves in and out of the detents as the scroll wheel rotates, with the arm biasing the follower against movement out of the detents. The carriage may also include pivots for relative movement of the carriage and scroll wheel assembly with respect to a housing, and a tab for actuating a switch.

20 Claims, 10 Drawing Sheets

U.S. PATENT DOCUMENTS

| | | | |
|---|---|---|---|
| 5,774,075 A | 6/1998 | Palalau et al. | |
| 5,808,568 A | 9/1998 | Wu | |
| 5,910,798 A | 6/1999 | Kim | |
| 5,912,661 A | 6/1999 | Siddiqui | |
| 5,952,997 A | 9/1999 | Hu | |
| 5,956,018 A | 9/1999 | Pejic et al. | |
| 5,959,614 A | 9/1999 | Ho | |
| 5,963,197 A | 10/1999 | Bacon et al. | |
| 6,075,575 A | 6/2000 | Schein et al. | |
| 6,097,372 A | 8/2000 | Suzuki | |
| 6,128,006 A | 10/2000 | Rosenberg et al. | |
| 6,132,118 A | 10/2000 | Grezeszak | |
| 6,188,393 B1* | 2/2001 | Shu | 345/184 |
| 6,198,473 B1 | 3/2001 | Armstrong | |
| 6,204,838 B1 | 3/2001 | Wang | |
| 6,300,939 B1 | 10/2001 | Decker et al. | |
| 6,323,843 B2* | 11/2001 | Giles et al. | 345/163 |
| 6,323,844 B1 | 11/2001 | Yeh et al. | |
| 6,337,679 B1 | 1/2002 | Chou | |
| 6,340,800 B1 | 1/2002 | Zhai et al. | |
| 6,340,966 B1 | 1/2002 | Wang et al. | |
| 6,348,912 B1 | 2/2002 | Smith | |
| 6,353,429 B1 | 3/2002 | Long | |
| 6,359,611 B2 | 3/2002 | Chan | |
| 6,424,355 B2 | 7/2002 | Watanabe et al. | |
| 6,519,003 B1 | 2/2003 | Swayze | |
| 6,522,321 B1 | 2/2003 | Chen et al. | |
| 6,534,730 B2 | 3/2003 | Ohmoto et al. | |
| 6,555,768 B2 | 4/2003 | Deruginski et al. | |
| 6,570,108 B2 | 5/2003 | Lin | |
| 6,608,616 B2 | 8/2003 | Lin | |
| 6,697,050 B1 | 2/2004 | Shinohe et al. | |
| 6,717,572 B1 | 4/2004 | Chou et al. | |
| 6,809,275 B1 | 10/2004 | Cheng et al. | |
| 6,956,558 B1* | 10/2005 | Rosenberg et al. | 345/156 |
| 2002/0149566 A1 | 10/2002 | Sarkissian | |
| 2002/0175893 A1 | 11/2002 | Ore-Yang | |
| 2003/0025673 A1 | 2/2003 | Ledbetter et al. | |
| 2003/0076303 A1 | 4/2003 | Huppl | |
| 2003/0095096 A1 | 5/2003 | Robbin et al. | |
| 2003/0107547 A1 | 6/2003 | Kehlstadt et al. | |
| 2004/0051392 A1 | 3/2004 | Badameh | |
| 2004/0150623 A1 | 8/2004 | Ledbetter et al. | |
| 2005/0104854 A1 | 5/2005 | Su et al. | |

FOREIGN PATENT DOCUMENTS

| | | | |
|---|---|---|---|
| CN | 2491885 Y | | 5/2002 |
| CN | 1267016 A | * | 9/2002 |
| EP | 1258019 B9 | | 11/2002 |
| JP | 07-092939 | | 4/1995 |
| JP | 2000-200147 | | 7/2000 |
| TW | 347128 | | 12/1998 |
| TW | 356265 | | 4/1999 |

OTHER PUBLICATIONS

<http://www.contourdesign.com/rollerbar.htm>, Contour Design-RollerBar Mousing Station-Optical Technology, 2 sheets, Jan. 2001 and 1 sheet press release dated Nov. 29, 2000.

<http://www.mousetrapper.dk>, Mouse Trapper product description, 12 color sheets including original Danish language and English translation as performed by Translation Experts Ltd. Service, date of product release unknown but believed to be prior to Jan. 8, 2002.

Web page reviewing "Kensington TurboRing Trackball"; <http://www.avault.com/hardware/print_review.asp?review=turboring>; publication date unknown, but believed to be prior to Jun. 3, 2002.

Web page reviewing "TurboRing"; <http://www.macworld.com/2000/10/reviews/turboring.html>; publication date unknown, but believed to be prior to Jun. 3, 2002.

Web page from "Van's Hardware"; <http://www.vanshardware.com/reviews/2001/october/011002_TurboRing/011002_TurboRing.htm>; published Oct. 2, 2001.

Web page reviewing "TurboRing"; <http://www.keyalt.com/pointdevices/turboring.htm>; publication date unknown, but prior to Apr. 2, 2002.

Web page for "Micro TRAC™"; <http://www.microspeed.com/products/pd600s.html>; publication date unknown, but believed to be prior to Apr. 2, 2002.

Web page for "Kid TRAC" model PD-280S; <http://www.microspeed.com/products/kidtrac.html>; publication date unknown, but believed to be prior to Apr. 2, 2002.

Web page for Kid Trac User's Manual; <http://www.microspeed.com/pages/support/manuals/kidtracm.html>; publication date unknown, but believed to be prior to Apr. 2, 2002.

Web page for "Ateck" A4 RFW-33 Radio Wireless PS/2 Mouse; <http://www.shop.store.yahoo.com/4itech/a4rfradwirps.html>; publication date unknown, but believed to be prior to Jun. 28, 2002.

Web page for "Sakar Yahoo! 4D Internet Scroll Mouse" and "Sakar Optical Mouse w/Email alert Metallic Silver (USB)"; <http://www.slarp.com/products/Input_Devices/Mice_and_Trackballs/>; publication date unknown, but believed to be prior to Jun. 28, 2002.

Web page for "ICONCEPTS 70152"; <http://www.panwebi.com/products/computer/mouse/70152.htm>; publication date unknown, but believed to be prior to Jun. 28, 2002.

Web page for "Yahoo 8D Internet Mouse"; <http://www.panwebi.com/products/computer/mouse/8dinternetmouse.htm>; publication date unknown, but believed to be prior to Jun. 28, 2002.

"Photo A": photograph of scroll wheel from LOGITECH cordless optical mouse, P/N 851497-0000; date of first availability and/or disclosure prior to (or believed to be prior to) application filing date.

"Photo B": (second) photograph of scroll wheel from LOGITECH cordless optical mouse, P/N 851497-0000; date of first availability and/or disclosure prior to (or believed to be prior to) application filing date.

"Photo C": photograph of scroll wheel from mouse manufactured by A4tech Co., Ltd., Taipei, Taiwan; date of first availability and/or disclosure prior to (or believed to be prior to) application filing date.

"Photo D": (second) photograph of scroll wheel from mouse manufactured by A4tech Co., Ltd., Taipei, Taiwan; date of first availability and/or disclosure prior to (or believed to be prior to) application filing date.

"Photo E": photograph of scroll wheel from mouse manufactured by KYE Systems, Taipei, Taiwan; date of first availability and/or disclosure prior to (or believed to be prior to) application filing date.

"Photo F": photograph of scroll wheel from RAZER "Boomslang" mouse, available from Kama LLC, Taiwan; date of first availability and/or disclosure prior to (or believed to be prior to) application filing date.

* cited by examiner

MODULAR SCROLL WHEEL WITH INTEGRAL DETENT-ENGAGING SPRINT TAB

This application is a continuation of U.S. patent application Ser. No. 10/158,996, filed Jun. 3, 2002, now U.S. Pat. No. 6,987,505 the entire contents of which are incorporated herein by reference.

FIELD OF THE INVENTION

This invention relates to scroll wheels on mice, trackballs and other user input devices.

BACKGROUND OF THE INVENTION

In many computers, user input (e.g., cursor control, screen scrolling, etc.) is often achieved by way of a pointing device such as a mouse or a trackball. A typical computer mouse 1 is shown in FIG. 1. Mouse 1 has a case 16 having a bottom case 20 and an upper case 18. As a user slides mouse 1 across a planar (or substantially planar) surface, motion detectors and encoders within case 16 may convert the two-dimensional movement of the mouse across the surface into horizontal and vertical motion of a cursor, pointer, or other object on a computer screen. Mouse 1 has two buttons 8 and 12 which a user can "click" or "double click" to select something on a computer screen. Other mice may have fewer or additional buttons, or other features. Mouse 1 may be connected to a computer or other device by a cord 5 through which mouse 1 may receive power and communicate with a computer (or other device). Alternatively, mouse 1 could be battery powered and communicate via a wireless connection.

Mouse 1 also has a scroll wheel 14. Scroll wheel 14 is located such that the mouse user can comfortably turn the scroll wheel with a finger. The mouse and/or computer may be configured such that turning the wheel causes the screen image to scroll upwards or downwards. The scroll wheel may be configured to perform other functions, such as moving a screen object in a z direction; changing the zoom or other attributes of a screen image; scrolling horizontally; and innumerable other functions. A scroll wheel may also be configured to act as an additional button when pressed by the user.

To prevent the scroll wheel from rotating undesirably (e.g., when the user is moving the mouse but not turning the wheel), to provide a desired tactile sensation for the user, and to provide a means of indexing wheel rotation into discrete increments, some type of restraint is typically imposed on scroll wheel rotation. A common restraint consists of a series of regularly-spaced ridges, detents or other structures on a surface of the wheel or its axis, and a follower biased into contact with the detents. As the wheel rotates, the follower is biased to resist movement out of a detent, and the torque necessary to continue rotating the wheel increases slightly. As the user increases the applied torque (i.e., continues to turn the wheel), the follower rides over a ridge (or other structure separating two detents), whereupon the needed torque decreases until the follower is biased into the next detent. In this way, the user can easily gauge (and make) relatively uniform scrolling movements.

Existing mice scroll wheels restrain wheel rotation through a variety of configurations. U.S. Pat. No. 5,912,661, titled "Z-Encoder Mechanism" and owned by assignee of this invention, describes a configuration in which the detents are located on the axle of the scroll wheel. A metal spring attached to a printed circuit board within the mouse biases a follower into contact with the detents. An improvement upon this configuration is described in U.S. Pat. No. 6,353,429, titled "Detented Optical Encoder" and also owned by the assignee of this invention. Specifically, instead of a metal spring biased into contact with the axle detents, a plastic bracket contacts the axle near one of its rotational hubs and biases the axle upward so as to provide z-switch functionality. A follower, located within the portion of the bracket cradling the axle, is thereby simultaneously biased into contact with the detents. Further improvements are possible, however. For example, the configuration described in the '429 patent requires assembly of at least 4 parts to provide indexed rotation. Because each of these parts (like all mechanical components) will have dimensional tolerances, a "tolerance stack-up" of the assembly results. This tolerance stack-up can potentially result in a rotational torque that may vary from mouse to mouse unless relatively small tolerances are maintained. This can increase manufacturing expense.

In another configuration, regularly-spaced radially-extending indentations are molded into (or otherwise formed in) a side of a scroll wheel in a spoke-like arrangement. A follower piece is biased into contact with the spoke-like indentations on the side of the wheel. The follower piece may be a molded extension of a carriage or other structure supporting a wheel axle, or it may be a separate member that is attached to the carriage. A potential disadvantage of this configuration, however, is the variability in torque required to rotate the wheel in one direction versus the other. In the case of a separate member attached to the carriage, an additional part is required, resulting in additional assembly steps, cost and potential tolerance stacking problems. In yet another configuration, the indentations are not formed in the side of the wheel in a spoke-like arrangement. Instead, a series of ridges and/or depressions are formed on an inner circumference of the wheel. A follower is biased radially outward into contact with the ridges and/or depressions. However, known scroll wheels implementing this configuration utilize a separate biasing member that is not an integral part of the carriage supporting the wheel axle.

A scroll wheel having circumferential detents that are acted upon by a biased follower integrally formed as part of the carriage would result in advantageous savings in assembly steps and expense. Such a design would also facilitate greater control over the fit of the components and allow greater performance consistency among the scroll wheels in different mice. For these and other reasons, advantages can be obtained from further refinements in scroll wheel design.

SUMMARY OF THE INVENTION

The present invention improves upon existing scroll wheel designs by providing a single component that rotatably supports the scroll wheel, and which has an integral follower arm extending into a well within which the scroll wheel rotates. Formed on a circumferential surface of the scroll wheel are regularly spaced detents or other structures forming regularly spaced regions of alternating height. Located on an end of the follower arm is a follower which rests within the detents. As the scroll wheel rotates and the follower is pushed out of a detent, the follower arm biases the follower radially into the surface on which the detents are located. By integrally forming the follower and follower arm as part of the same component that houses and rotatably supports the scroll wheel, the number of components is reduced, reducing tolerance stack-up and providing other advantages. The carriage may further be pivotably attached to a mouse or other structure, and a tab formed on the carriage. In this manner, the scroll wheel can also function as an externally depressible button.

In one embodiment, a modular scroll wheel assembly includes a scroll wheel sized for movement by a finger of a human user. The scroll wheel has a circumferential surface with regularly spaced regions of alternating height located on that surface. The modular scroll wheel assembly further includes a single-piece carriage that supports and rotatably holds the scroll wheel. The carriage has first and second sides that define a wheel well within which the scroll wheel rotates. An integral follower arm is disposed on the first side of the carriage; the follower arm has a follower in contact with the circumferential surface and is biased to resist deflection as the scroll wheel rotates.

An embodiment of a computer mouse according to the invention includes a housing sized and configured for manual movement by a user across a surface so as to permit a corresponding movement of a screen object on a computer display. The housing has a bottom case and an upper case coupled to the bottom case, and at least two depressible buttons movably attached to the upper case. The mouse further includes a scroll wheel having a circumferential surface with regularly spaced regions of alternating height located around that circumferential surface. A single-piece carriage rotatably supports the scroll wheel such that a portion of the scroll wheel extends outside of the housing. The carriage includes first and second sides forming a wheel well within which the scroll wheel rotates, and an integral follower arm on the first side of the carriage. A follower on an end of the arm is in contact with the circumferential surface and is biased to resist deflection as the scroll wheel rotates.

Other features and advantages of the invention are set forth below in the detailed description or will be apparent to persons skilled in the art in light of that description.

DETAILED DESCRIPTION OF THE INVENTION

Figure 1:
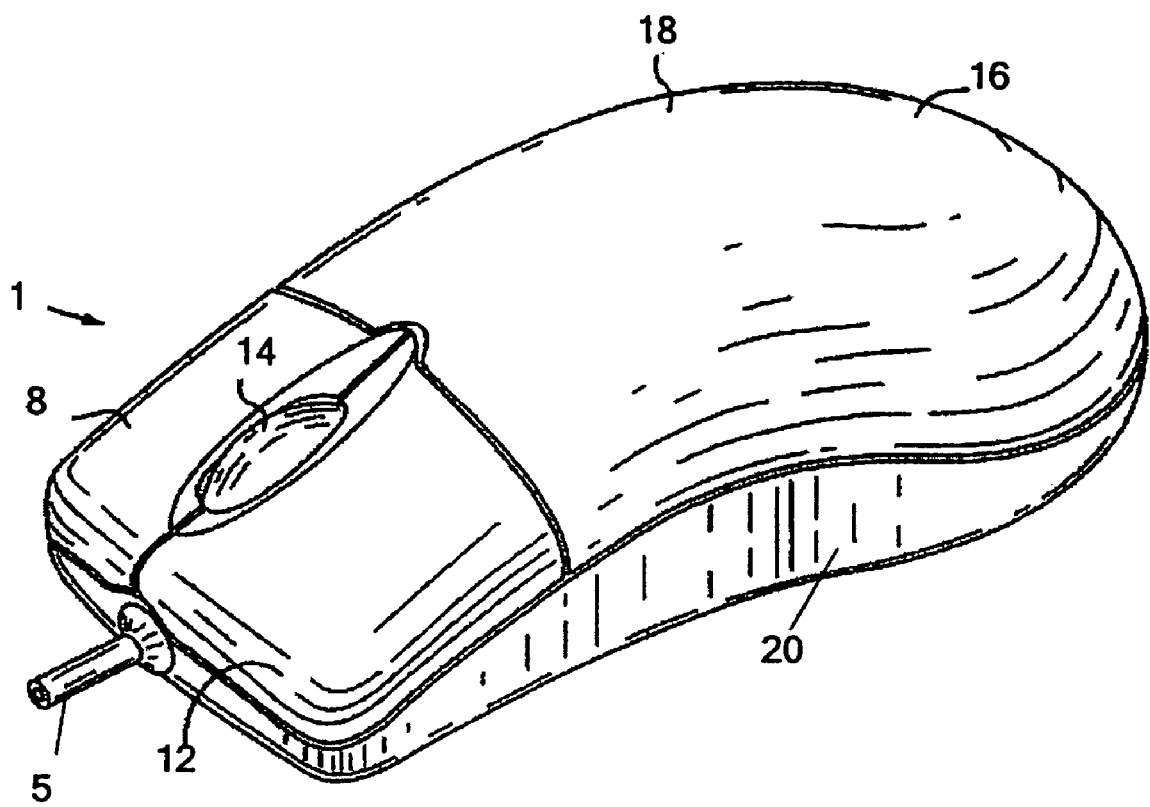
FIG. 1 is perspective outer view of a computer mouse having a scroll wheel.
Figure 2:
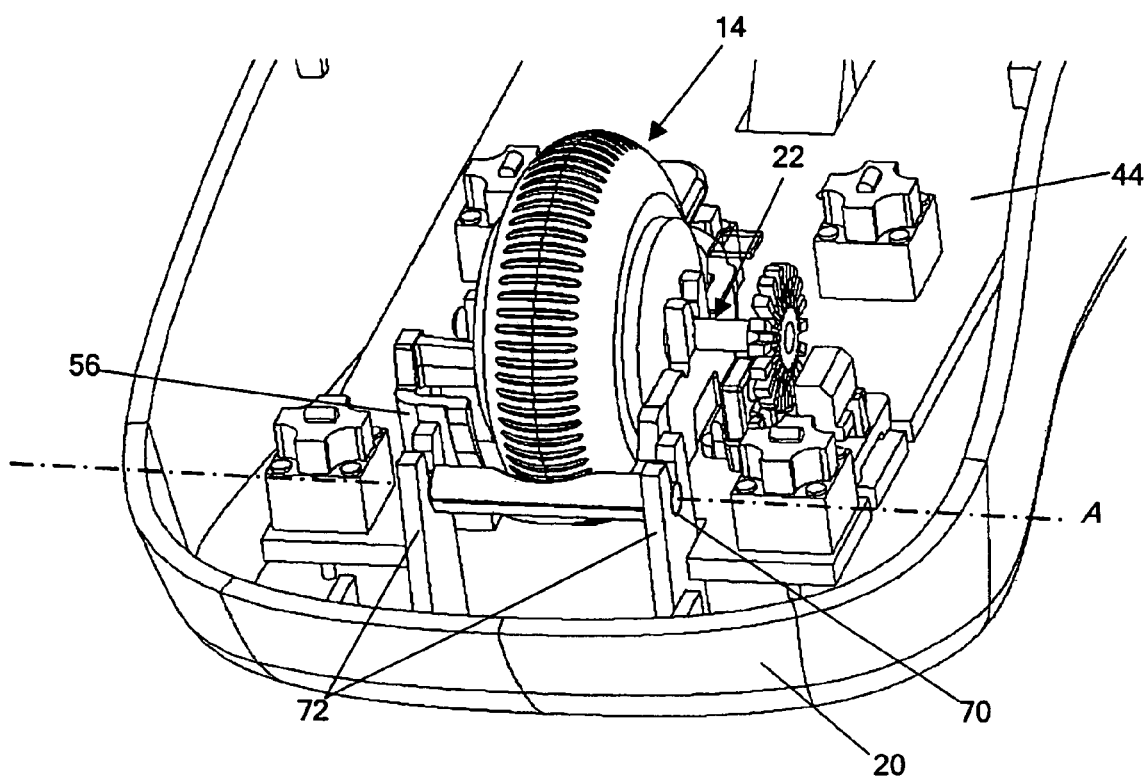
FIG. 2 is a front perspective view, with the upper case removed, of the mouse of FIG. 1.

An improved scroll wheel assembly according to the present invention is shown in FIGS. 1-11. With reference to FIG. 2, the upper case, as well as buttons 8 and 12, have been removed for purposes of illustration. Located within mouse 1 and attached to lower case 20 is a printed circuit board 44. Printed circuit board 44 electrically interconnects various mouse components, and also provides an internal structure to which other components may be attached. Scroll wheel 14 has an attached axle 22. Axle 22 rotates within axle guides 58 (see FIG. 3) defined within carriage 56. The mouse of FIGS. 1-11 is used only by way of example. Persons skilled in the art will appreciate that the invention is likewise applicable to other mouse designs. Such persons will also appreciate that the invention is likewise applicable to trackballs, keyboards and other input devices having (or capable of having) a scroll wheel.

Figure 3:
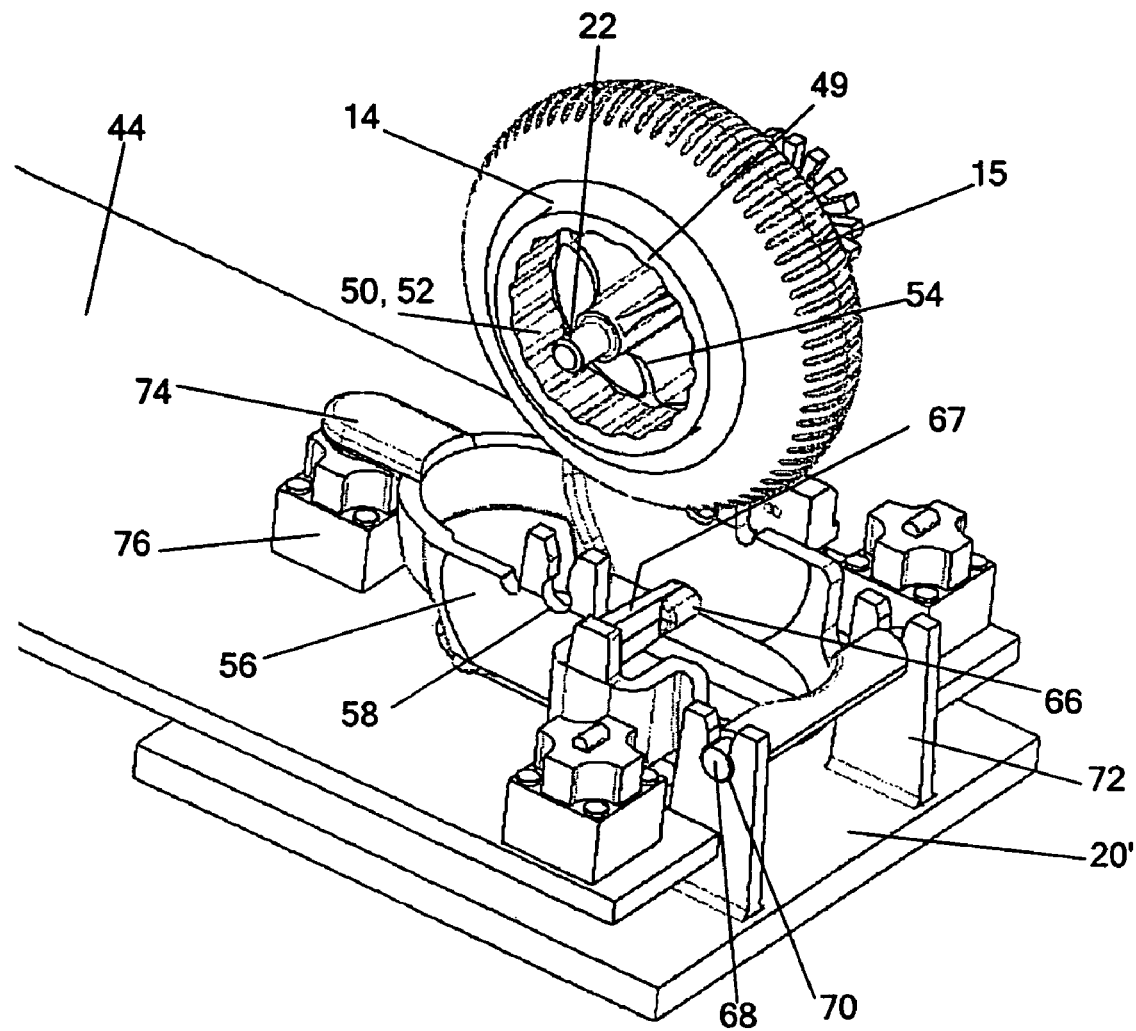
FIG. 3 is an exploded front perspective view of a scroll wheel, carriage and other internal components of the mouse of FIG. 1.
Figure 4:
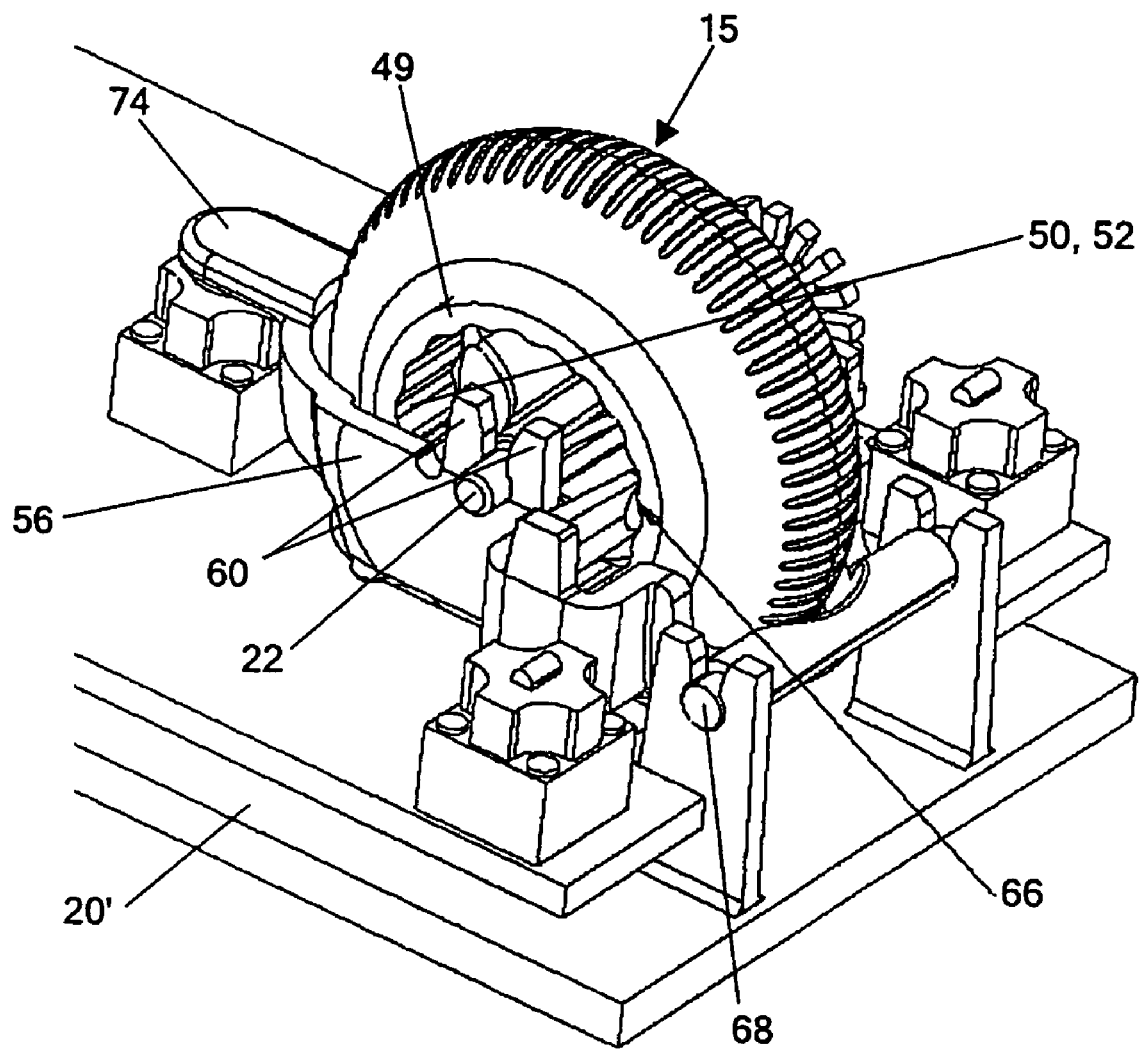
FIG. 4 is an assembled front perspective view of a scroll wheel, carriage and other internal components of the mouse of FIG. 1.

FIG. 3 is an "exploded" front perspective view of an embodiment of the improved scroll wheel assembly according to the present invention. The upper case of the mouse has been removed for clarity, and various circuit components also omitted for purposes of clarity. Most of the lower case of the mouse has also been removed, with portion 20' representing a small part of the lower case 20. FIG. 4 is similar to FIG. 3, but in an assembled condition. Scroll wheel 14 may (but need not) include an outer surface 15 that is textured to allow for easier movement by the user. In the depicted embodiment, scroll wheel 14 includes a hub 49 that is substantially open on at least one face, and has an exposed inner circumferential surface 50 exposed by the opening in that face. Evenly spaced along inner circumferential surface 50 are a series of peaks and troughs forming detents 52. Axle 22 is attached to wheel 14, which attachment may be strengthened by spokes 54. Wheel 14, axle 22 and spokes 54 may be molded so as to form a single integral component.

After assembly, a portion of scroll wheel 14 rests within carriage 56. Carriage 56 is a single, integral piece which can be molded. Carriage 56 includes axle guides 58 on both sides of carriage 56. Each axle guide 58 may be formed between a pair of uprights 60 extending from (and integral to) carriage 56. Although both axle guides 58 are shown in the drawings as having a "snap-in" configuration formed by an angled inlet between uprights 60, other axle guide configurations are possible. For example, one axle guide 58 could be an enclosed hole (e.g., without a gap between the uprights 60) into which one end of axle 22 is inserted, with the other end of axle 22 being snapped into the other axle guide. Each axle guide 58 supports axle 22 for rotation, and is slightly larger in diameter than the portion of axle 22 that fits therein so as to allow rotation of axle 22 and wheel 14.

Carriage 56 further has an integral follower arm 67 and follower 66. Follower arm 67 projects inwardly towards scroll wheel 14 and is used to provide indexed wheel motion. After assembly, and as shown in FIG. 4, follower 66 (located on the inwardly projecting end of follower arm 67) is in contact with the inner circumferential surface 50. As wheel 14 is rotated within the wheel well 57 formed by carriage 56, follower 66 is alternatively forced out of, and allowed to descend into, detents 52. As follower 66 is forced out of a detent 52, it is pushed radially inward against a radially outward bias of the spring force of follower arm 67. In this manner, indexed rotation of scroll wheel 14 is obtained, and scroll wheel 14 is prevented from rotating except when such rotation is desired.

Figure 9:
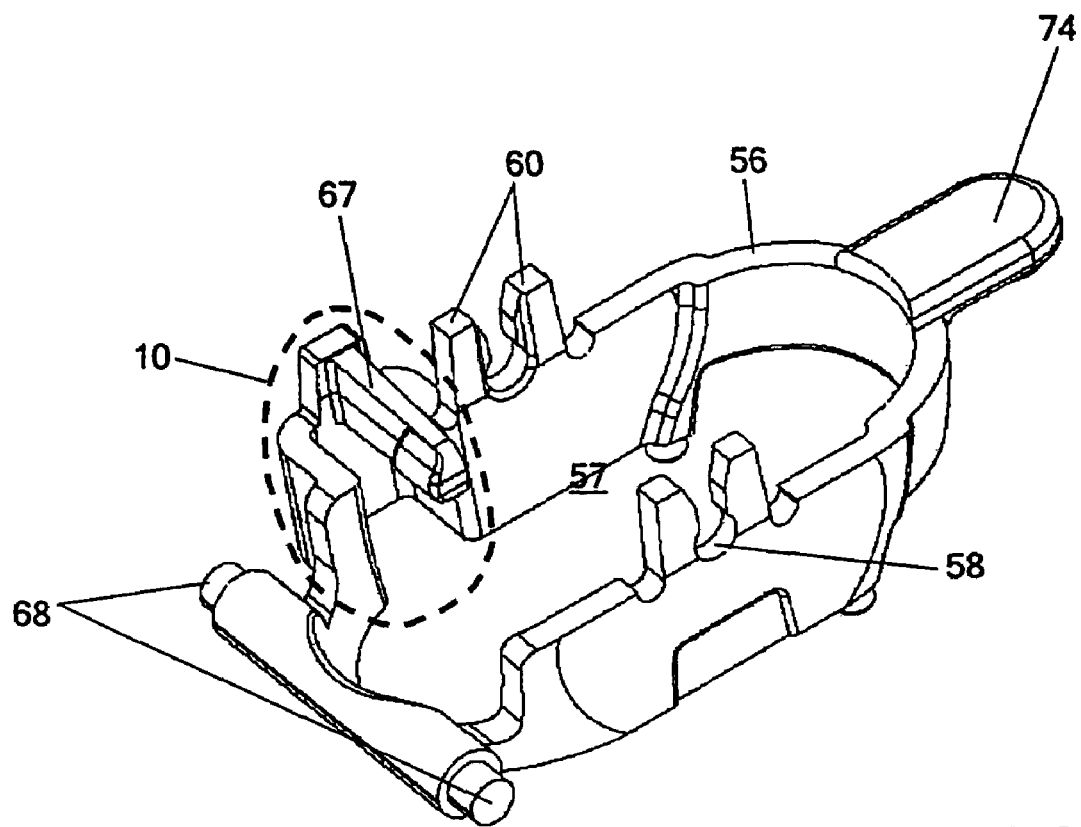
FIG. 9 is a perspective view of a scroll wheel carriage according to the invention.
Figure 10:
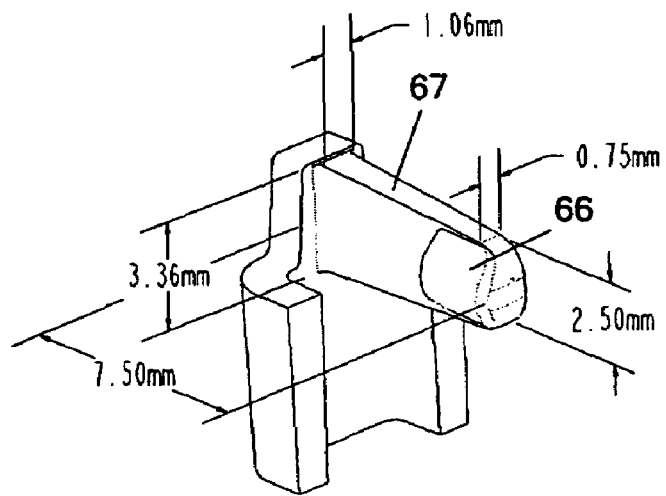
FIG. 10 is an enlarged perspective view of a region of FIG. 9.
Figure 11:
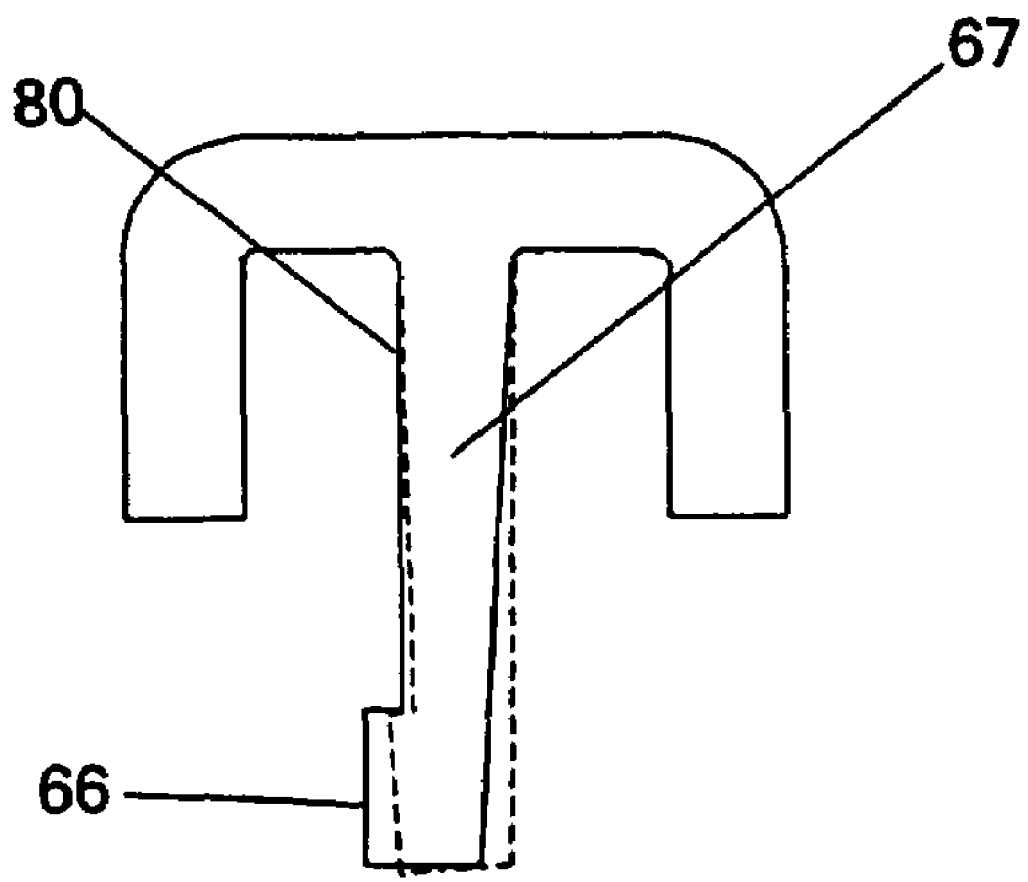
FIG. 11 is an enlarged top view of the follower arm and a portion of the carriage.

FIG. 9 is a perspective view of carriage 56 without scroll wheel 14. FIG. 10 is an enlarged view of the region 10 of FIG. 9, and shows exemplary dimensions for follower 66 and arm 67. Dimensions may vary depending on material, scroll-wheel size, and other factors. As shown in FIG. 11 (which is a top view of the region shown in perspective in FIG. 10), the face 80 of arm 67 facing toward the detents may be straight when the follower 66 is centered within a trough (i.e., within a detent). As the dotted line shows, arm 67 flexes backward when force is exerted on follower 66

As shown if FIGS. 2-6, carriage 56 may be mounted for pivotal movement within a mouse or other structure. Carriage 56 may include pivots 68. Pivots 68 fit within pivot guides 70 formed in posts 72, and are retained therein for pivotal movement. In the depicted embodiment, snap-fit pivot guides are shown; as with axle guides 58, however, alternative arrangements are possible. Posts 72 are attached to (or formed as a part of) lower case 20'. Carriage 56 thereby pivots about an axis A passing through pivots 68 and pivot guides 70. Located at the opposite end of carriage 56 is switch tab 74. Switch tab 74 acts upon microswitch 76 when the user exerts downward force on wheel 14; switch tab 74 is thereby pressed against microswitch 76, and actuates same. Microswitch 76 can be a self-biased switch such as a metallic beam switch, a metallic disc switch, or other type self-biasing switch which will support the carriage when not being pressed down by a user. As is known in the art, these types of switches are mechanically biased to an "off" state, and are only "on" when an external force is exerted on the switch. Although not shown, carriage 56 could alternatively be biased upward by a separate spring or resilient member. In such an alternative configuration switch 76 would not need to be self-biased.

Figure 5:
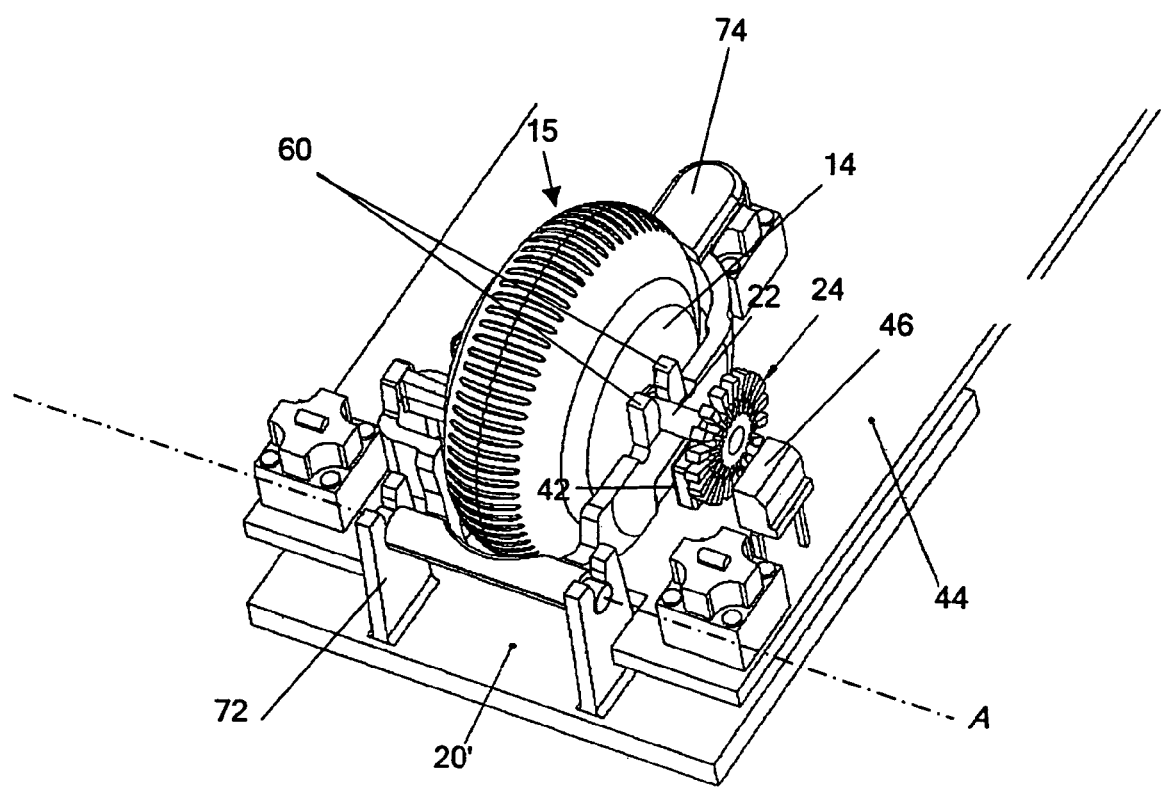
FIG. 5 is another assembled front perspective view of a scroll wheel, carriage and other internal components of the mouse of FIG. 1, but from a different angle than that of FIG. 4.
Figure 6:
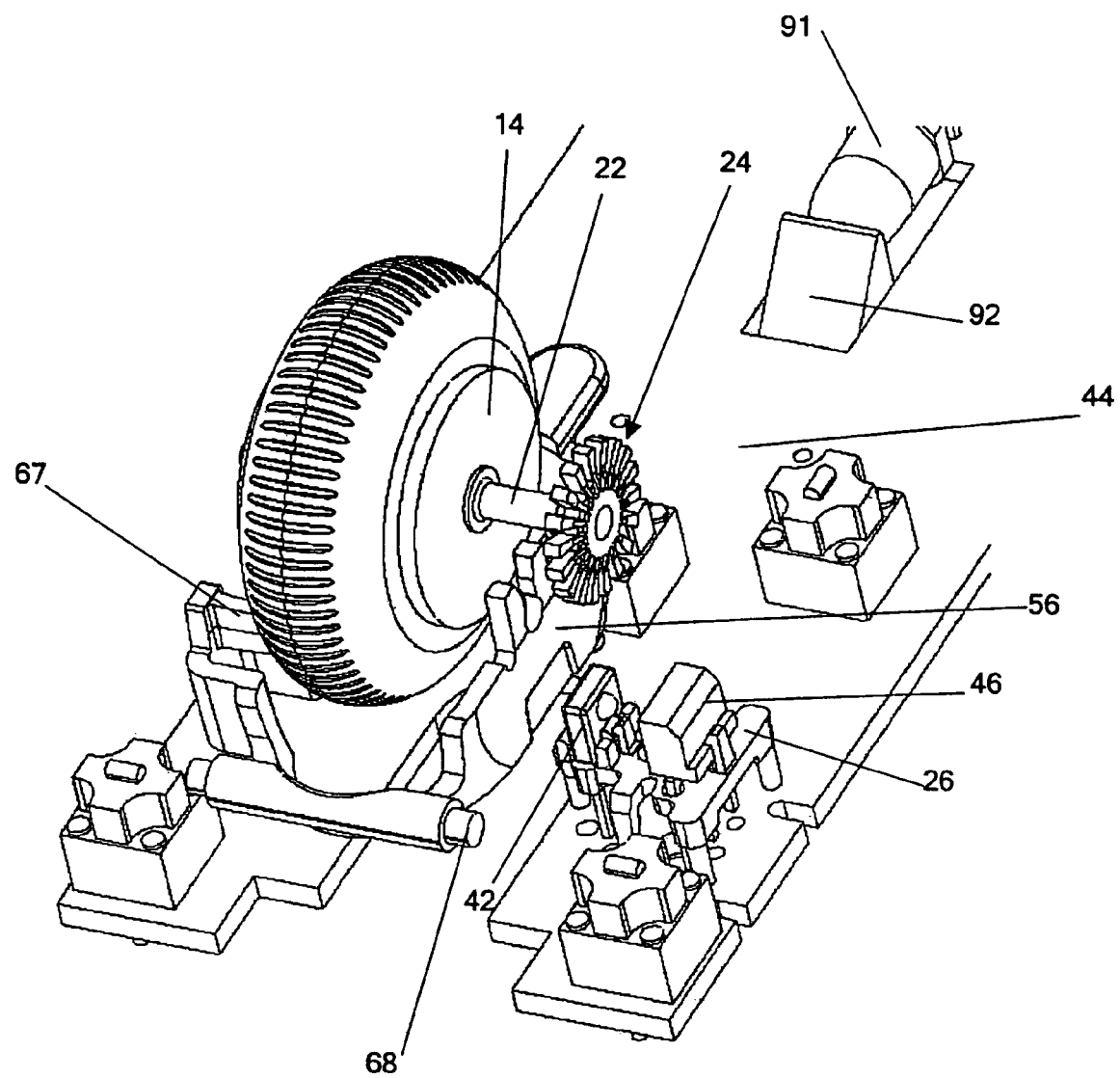
FIG. 6 is another exploded front perspective view of a scroll wheel, carriage and other internal components of the mouse of FIG. 1, but from a different angle than that of FIG. 3.

FIG. 6 is an exploded front perspective view of the mouse and scroll wheel from an opposite side of the mouse. FIG. 5 is similar to FIG. 6, but in an assembled condition and showing additional components. Encoder wheel 24 is attached to (or formed as a part of) the end of axle 22. After assembly, and as shown in FIGS. 2 and 5, encoder wheel 24 passes between a light emitting diode (LED) 42 and receptor(s) 46. When scroll wheel 14 is rotated, the "spokes" of encoder wheel 24 alternatively allow and block light from LED 42 from reaching receptor(s) 46, thereby facilitating detection of scroll wheel rotation. The details of such detection are known in the art, and are not critical to the present invention. The detents 52 could be configured such that, when the follower 66 rests within a detent, light from LED 42 reaches receptor(s) 46. Alternatively, detents 52 could be configured so that, when the follower 66 rests within a detent, the encoder wheel 24 partially or completely blocks light from LED 42 from reaching receptor(s) 46. LED 42 and receptor(s) 46 can be mounted upon a bracket 26, which could in turn be mounted to circuit board 44.

In one embodiment, hub 49 of scroll wheel 14, axle 22 and spokes 54 may be integrally formed from any desired plastic such as an acetyl resin (for example, DELRIN®, available from E.I. duPont de Nemours and Company of Wilmington, Del.). If desired, a rubber-like thermoplastic elastomer such as SANTOPRENE® (available from Advanced Elastomer Systems of Akron, Ohio) may be overmolded or otherwise used to form an outer surface 15 of wheel 14. Carriage 56 may also be molded from a plastic, for example Acrylonitrile Butadiene Styrene (ABS). The described materials are exemplary, however, and other materials and combinations are with thin scope of the invention. A small amount of lubricant can be added to the connections between axles 22 and axle guides 58 and between follower 66 and detents 52.

Figure 7:
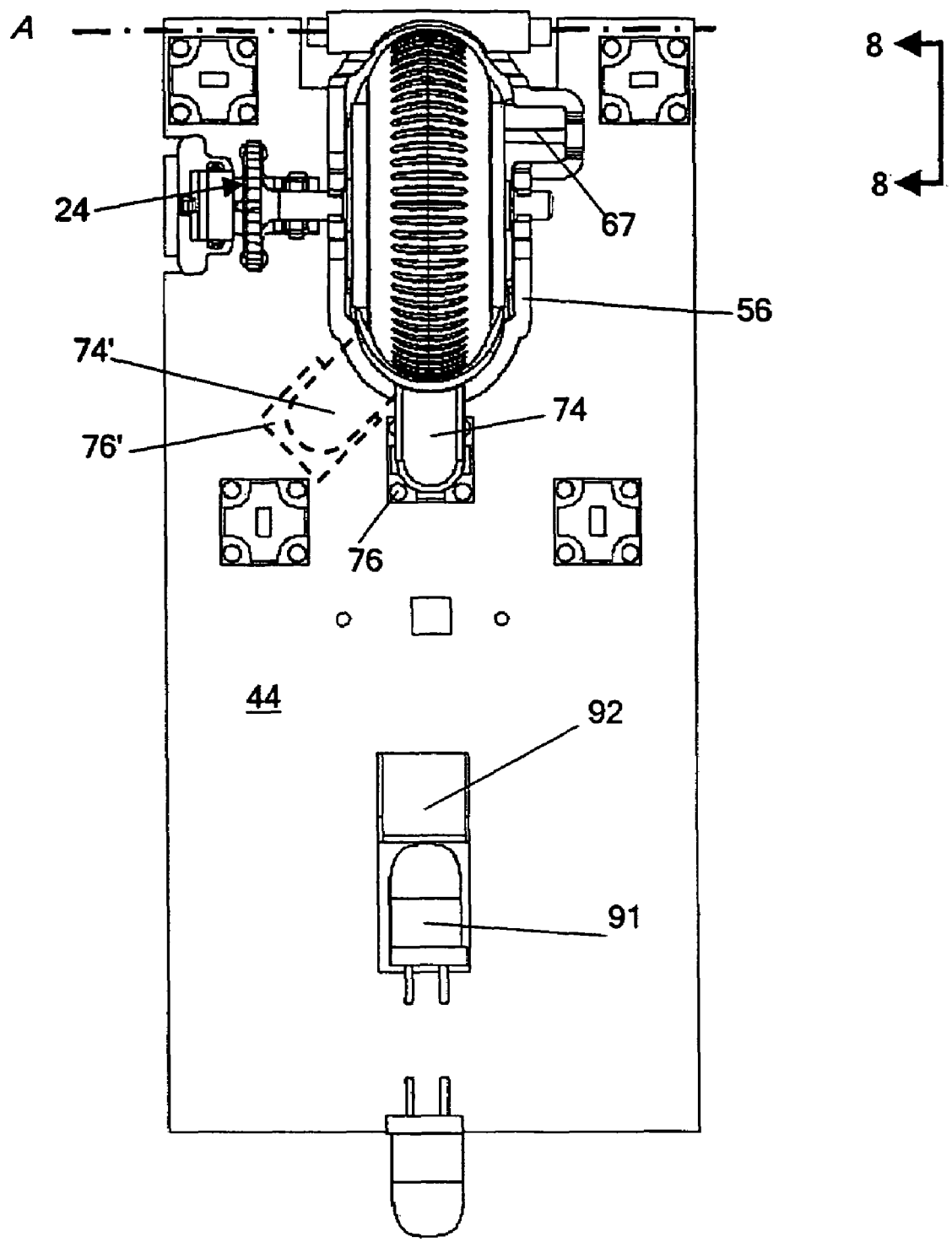
FIG. 7 is a top view of a scroll wheel, carriage and other internal components of the mouse of FIG. 1.
Figure 8:
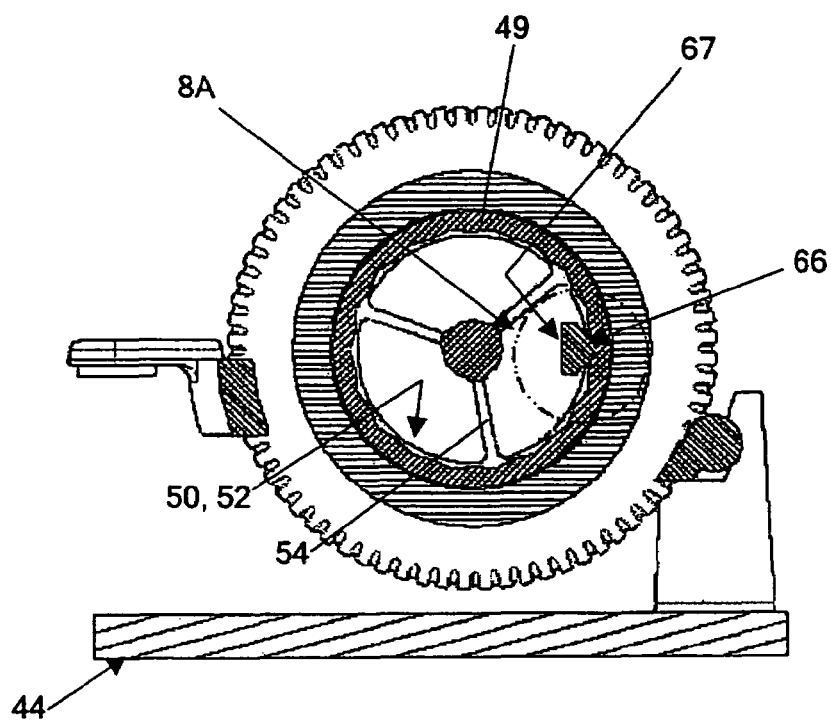
FIG. 8 is a cut-away view taken along lines 8-8 of FIG. 7.
Figure 8A:
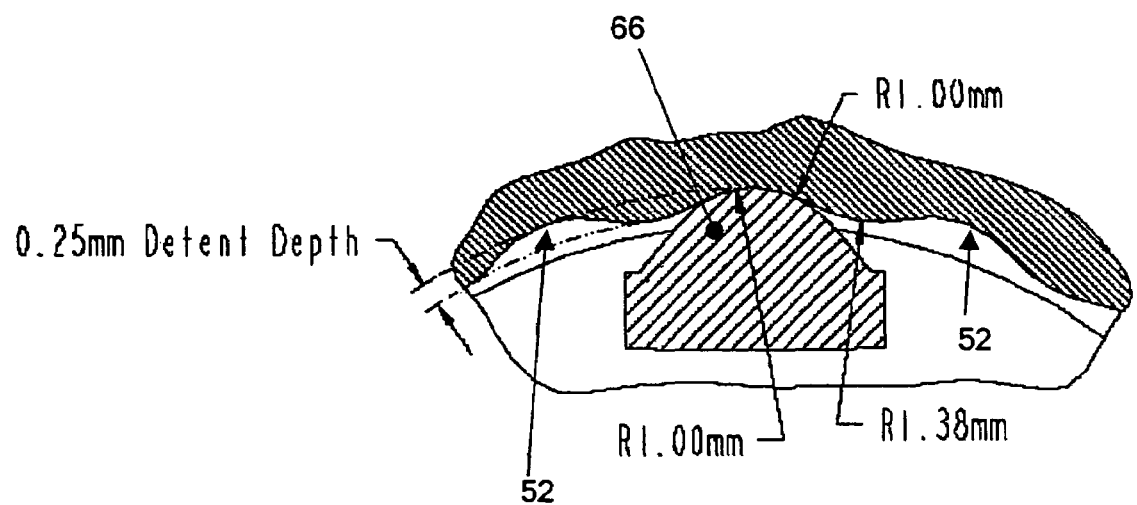
FIG. 8A is an enlarged view of a region of FIG. 8 that has been rotated 90° counterclockwise.

FIG. 7 is a top view of one embodiment of the invention installed on a mouse circuit board 44, with certain components omitted. Although shown in certain figures as located directly opposite the pivots 68, switch tab 74 could be located elsewhere. For example, switch tab 74 could be on one side of carriage 56, shown as item 74' in FIG. 7. Circuit board 44 may also house components for tracking mouse movement across a surface, such as LED 91 and receptor 92. Alternatively, mechanical encoder wheels and a captive rolling ball could be used, as could other motion tracking devices. FIG. 8 is a cutaway view taken along the line of sight 8-8 of FIG. 7. Various components have been completely or partially removed so as to more clearly reveal detents 52 and follower 66. As shown in FIG. 8, a scroll wheel in one embodiment of the invention may have eighteen (18) evenly-spaced detents 52 distributed on inner circumferential surface 50. FIG. 8A is an enlarged view of region 8A of FIG. 8, and has been rotated 90° counterclockwise for clarity. FIG. 8A shows dimensions for the embodiment of FIG. 8, but the dimensions, shapes and positioning of the components may vary as desired. Follower 66 has a shape generally matching the trough shape. Fatigue on follower 66 and the follower arm 67 may be reduced if there is substantially no preload upon the follower. In other words, when the scroll wheel is assembled and follower 66 is substantially centered within a detent 52, no significant force is exerted on follower 66 or arm 67 by wheel 14.

As is clear from the above description, the invention provides numerous advantages over other scroll wheel configurations. Contained within a single part are the guides within which the scroll wheel axles rotate, the follower and the follower arm. Because there are a minimum number of parts, tolerances can be more easily and accurately maintained. This in turn enhances consistency in scroll wheel performance from mouse to mouse. Reducing the number of parts also reduces assembly time and expense. The invention further provides a consistent feel for a user rotating the scroll wheel in either direction. In other words, the forward and reverse rotational torque is more closely equal than is the case in other designs.

Although an example of carrying out the invention has been described, those skilled in the art will appreciate that there are numerous variations and permutations of the above described device that fall within the spirit and scope of the invention as set forth in the appended claims. As but one example, the detents could alternatively be located on an inner circumferential surface that is on a portion of the scroll wheel axle inside of the wheel hub, with the follower facing radially inward. As another example, the detents could be molded (or otherwise formed) on the outermost surface of the scroll wheel, the carriage modified, and the follower oriented to face radially inward. As yet another example, the axle could alternatively be molded as two half axles extending from either side of the carriage into the wheel well, with depressions molded into the scroll wheel for those half axles. As set forth above, the scroll wheel of the invention can be incorporated into other mouse designs, into other pointing devices (e.g., trackballs), and other input devices (e.g., keyboards). These and other modifications are within the scope of the invention, which is to be limited only by the claims.

What is claimed is:

1. A modular scroll wheel assembly, comprising:
   a scroll wheel sized for movement by a finger of a human user having a circumferential surface having regularly spaced regions of alternating height located thereon; and
   single-piece carriage means for supporting and rotatably holding the scroll wheel, the single-piece carriage means having:
      wheel well means for defining a wheel well within which the scroll wheel rotates; and
      integral follower means for maintaining contact with the circumferential surface and for resisting deflection as the scroll wheel rotates.

2. The modular scroll wheel assembly of claim 1, wherein the scroll wheel further comprises first and second faces, and wherein an opening is defined in the first face so as to expose the circumferential surface.

3. The modular scroll wheel assembly of claim 2, wherein the carriage means is molded.

4. The modular scroll wheel assembly of claim 3, wherein:
   the scroll wheel further comprises an integral axle, and
   the carriage means further comprises axle guide means for rotatably holding the axle.

5. The modular scroll wheel assembly of claim 4, wherein the circumferential surface faces radially inward.

6. A modular scroll wheel assembly, comprising:
   a scroll wheel sized for movement by a finger of a human user having a circumferential surface having regularly spaced regions of alternating height located thereon; and
   single-piece carriage means for supporting and rotatably holding the scroll wheel, the single-piece carriage means having:
      wheel well means for defining a wheel well within which the scroll wheel rotates; and
      integral follower means for maintaining contact with the circumferential surface and for resisting deflection as the scroll wheel rotates,
   wherein the scroll wheel further comprises first and second faces, and wherein an opening is defined in the first face so as to expose the circumferential surface,
   wherein the single-piece carriage is molded,
   wherein the scroll wheel further comprises an integral axle,
   wherein the single-piece carriage further comprises axle guide means for rotatably holding the axle,
   wherein the circumferential surface faces radially inward, and
   wherein the regularly-spaced regions of alternating height comprise a sinusoidally-shaped series of peaks and troughs, and wherein the follower means has substantially no preload when the scroll wheel is rotated to a position in which the follower means is substantially centered within one of the troughs.

7. The modular scroll wheel of claim 6, wherein the scroll wheel and the carriage means are formed from dissimilar plastic materials.

8. The modular scroll wheel of claim 6, wherein the scroll wheel further comprises an overmolded rubber-like material forming an outermost circumferential surface.

9. A computer mouse, comprising:
   a housing sized and configured for manual movement by a user across a surface so as to permit a corresponding movement of a screen object on a computer display, the housing having:
      a bottom case and an upper case coupled to the bottom case, and
      at least two depressible buttons movably attached to the upper case;
   a scroll wheel having a circumferential surface having regularly spaced regions of alternating height located thereon; and
   single-piece carriage means for rotatably supporting the scroll wheel such that a portion of the scroll wheel extends outside of the housing, the single-piece carriage means having:
      wheel well means for defining a wheel well within which the scroll wheel rotates, and
      integral follower means for maintaining contact with the circumferential surface and for resisting deflection as the scroll wheel rotates.

10. The computer mouse of claim 9, wherein the scroll wheel further comprises first and second faces, and wherein an opening is defined in the first face so as to expose the circumferential surface.

11. The computer mouse of claim 10, wherein the carriage means is pivotably coupled to the housing, the carriage means further including tab means, the computer mouse further including a switch located within the housing such that external force upon the scroll wheel pivots the carriage means and causes the tab means to activate the switch.

12. The computer mouse of claim 11, wherein:
   the scroll wheel further comprises an integral axle, and
   the carriage means further comprises axle guide means for rotatably hold the axle.

13. The computer mouse of claim 12, wherein the switch is self-biased.

14. The computer mouse of claim 13, wherein the circumferential surface faces radially inward.

15. The computer mouse of claim 14, wherein the regularly-spaced regions of alternating height comprise a sinusoidally-shaped series of peaks and troughs, and wherein the follower means has substantially no preload when the scroll wheel is rotated to a position in which the follower means is substantially centered within one of the troughs.

16. The computer mouse of claim 15, wherein the scroll wheel and the carriage means are formed from dissimilar plastic materials.

17. The computer mouse of claim 15, wherein the scroll wheel further comprises an overmolded rubber-like material forming an outermost circumferential surface.

18. The computer mouse of claim 15, wherein the axle extends beyond at least first and second sides of the carriage means, and further comprising:
   an optical encoder wheel attached to the axle on a portion thereof extending beyond the at least one of the first and second sides of the carriage means;
   a light emitting diode located on a first side of the encoder wheel and fixed with respect to the encoder wheel; and
   a receptor located on a second side of the encoder wheel and fixed with respect to the encoder wheel.

19. The modular scroll wheel assembly of claim 1, wherein the follower means and the remainder of the carriage means are made of a same material.

20. The computer mouse of claim 9, wherein the follower means and the remainder of the carriage means are made of a same material.

* * * * *

UNITED STATES PATENT AND TRADEMARK OFFICE
CERTIFICATE OF CORRECTION

| | | |
|---|---|---|
| PATENT NO. | : 7,324,090 B2 | Page 1 of 1 |
| APPLICATION NO. | : 10/985956 | |
| DATED | : January 29, 2008 | |
| INVENTOR(S) | : James Y. Koo | |

It is certified that error appears in the above-identified patent and that said Letters Patent is hereby corrected as shown below:

In Face page, in field (54), under "Title" column 1, line 2, delete "SPRINT" and insert -- SPRING --, therefor.

In column 1, line 2, delete "SPRINT" and insert -- SPRING --, therefor.

Signed and Sealed this
Twenty-second Day of February, 2011

David J. Kappos
*Director of the United States Patent and Trademark Office*